March 16, 1954  T. F. ROSING ET AL  2,672,536

ELECTRIC CONTROL DEVICE

Filed Nov. 1, 1950  4 Sheets-Sheet 1

Inventors.
Edwin W. Seeger.
Theodore F. Rosing.
By W. Ehrson
Attorney.

Inventors.
Edwin W. Seeger.
Theodore F. Rosing
By W. E. Lyon
Attorney.

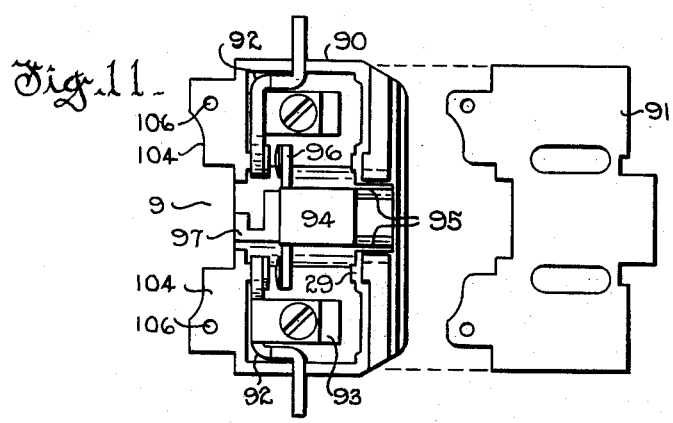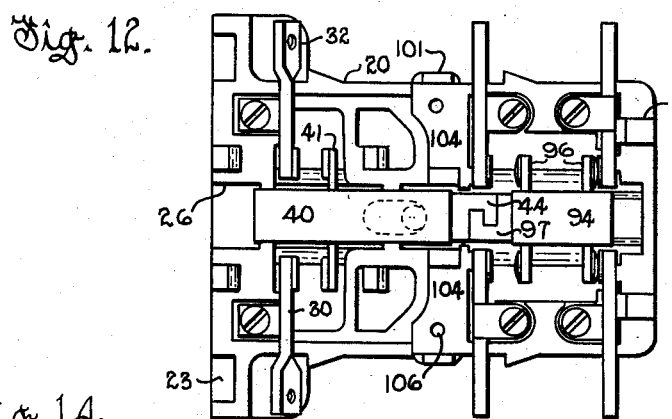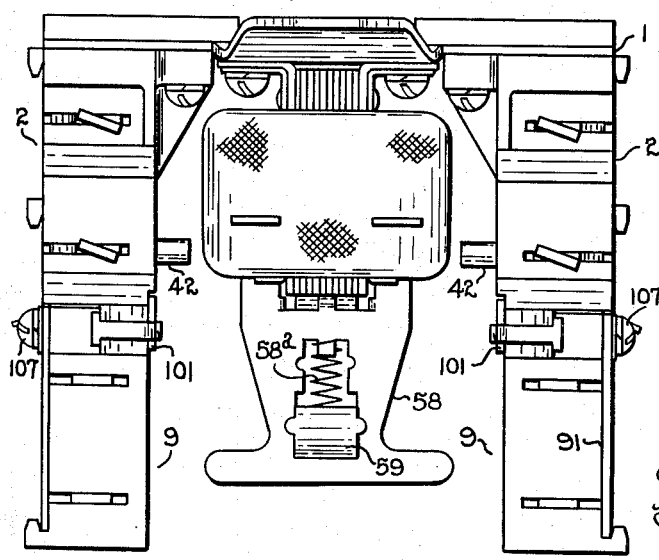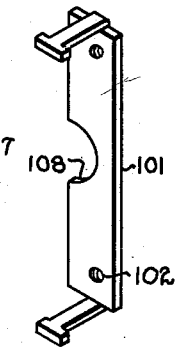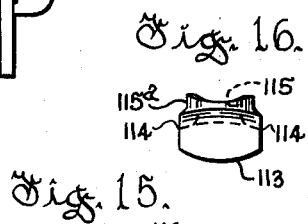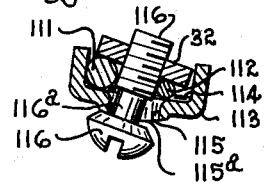

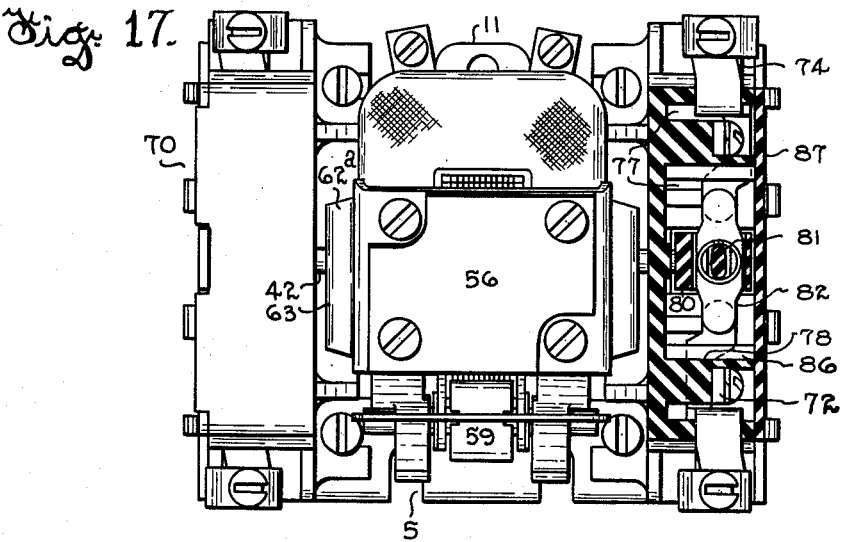
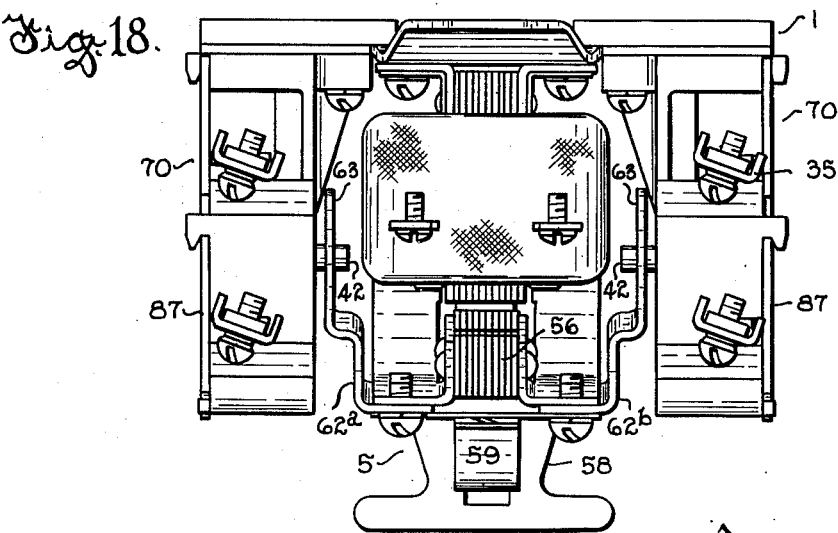

Patented Mar. 16, 1954

2,672,536

UNITED STATES PATENT OFFICE 2,672,536

ELECTRIC CONTROL DEVICE

Theodore F. Rosing, Shorewood, and Edwin W. Seeger, Wauwatosa, Wis., assignors to Cutler-Hammer, Inc., Milwaukee, Wis., a corporation of Delaware Application November 1, 1950, Serial No. 193,328

16 Claims. (Cl. 200—104)

This invention relates generally to electric control devices and more particularly to electromagnetically actuated switches which are suitable for use as contactors or relays.

One of the important objects of this invention is to provide an improved electromagnetically actuated switch, the particular arrangement of parts of which will lend itself both to the construction of relays and to all sizes of contactors.

Another object of this invention is to provide an improved electromagnetically actuated switch which may be readily assembled from a plurality of unit assemblies to facilitate production of control devices having a wide variety of circuit controlling characteristics.

A more specific object is to provide an improved electric control device having a plurality of unit assemblies which may be readily interchanged with other similar unit assemblies to vary the circuit controlling characteristics of the device.

A still more specific object is to provide an electric control device which is capable of providing a wide variety of circuit controlling characteristics simply by removing certain unit assemblies and replacing them with other similar assemblies, or merely by altering certain of the unit assemblies without removing them.

Another object is to provide an improved electromagnetically actuated switch in which the number of poles may be easily and readily increased many fold without increasing the area of the panel space required for the switch.

Another object is to provide an improved electromagnetic switch particularly suitable for use as a contactor and having provision for easy addition of unit type electrical interlocks without disassembling it, removing wiring, or adding insulators, and without increasing the area of the panel space required.

Another object is to provide an improved multipole electromagnetic switch in which the main contacts may be easily inspected and in which the contact assembly cover and the movable contact carrier may be removed without the use of tools.

Another object is to provide an improved electromagnetic switch having unit contact assemblies which are removable simply by loosening their mounting screws.

Another object is to provide an improved electromagnetic switch particularly suitable for use as a relay and in which the contacts are readily reversible to provide either or both normally open and normally closed operation.

Another important object is to provide an improved electric control device which, consistent with its novel features and a high performance standard, is more economical to manufacture than prior art devices.

Other objects and advantages of the invention will hereinafter appear.

The accompanying drawings illustrate several embodiments of the invention which will now be described, it being understood that various modifications may be made in the embodiments illustrated without departing from the spirit and scope of the appended claims.

In the drawings, wherein like reference numerals indicate like parts:

Fig. 11 is a side elevational view of a unit switch assembly and its cover plate which is particularly suitable as a single-pole interlock switch.

Fig. 12 is a side elevational view of a single-pole contactor switch having a two-pole interlock switch mounted thereon, the cover plates being removed.

Fig. 13 is a perspective view of the mounting strap which is used to hold together an interlock switch unit and its associated contactor switch.

Fig. 14 is a top plan view of a four-pole contactor switch made in accordance with our invention and also having four interlock poles, the movable armature being removed.

Fig. 15 is a detail sectional view of the pressure type terminal clamps shown in Figs. 3, 5, 17 and 18.

Fig. 16 is an end view of the clamping arm shown in Fig. 15.

Figs. 17 and 18 are, respectively, front elevational and top plan views of a four-pole relay switch made in accordance with our invention.

Figure 1:
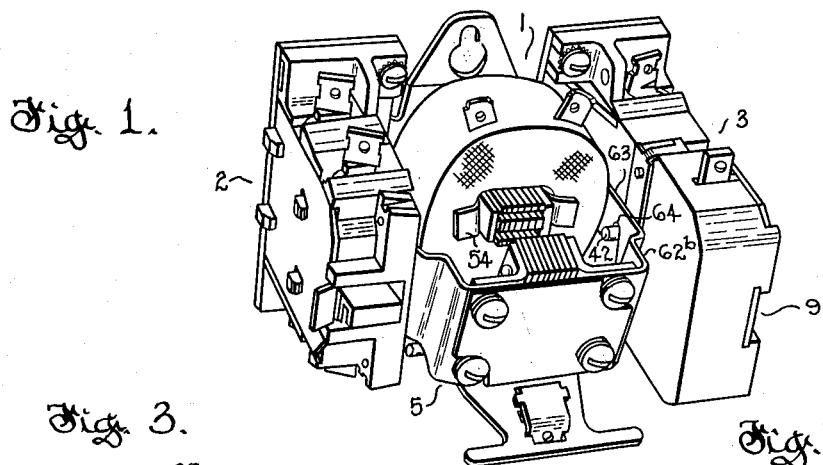
Figure 1 is a perspective view of a control device embodying our invention.

Referring to Fig. 1, the electric control device shown therein includes a mounting plate 1 upon which are removably mounted unit switch assemblies 2 and 3, together with their associated electromagnetic switch operating mechanism 5. On the front of switch 3 is removably mounted another unit switch assembly 9. The electromagnetic switch operating mechanism is generally similar to that shown in U. S. Patent No. 1,981,555 which issued to C. W. Kuhn on November 20, 1934, but differs therefrom in certain specific details as will hereinafter appear.

Figure 2:
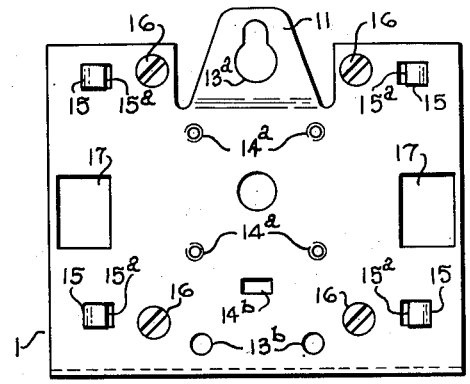
Fig. 2 is a front elevational view of the mounting plate or panel which comprises a part of the device shown in Fig. 1.
Figure 7:
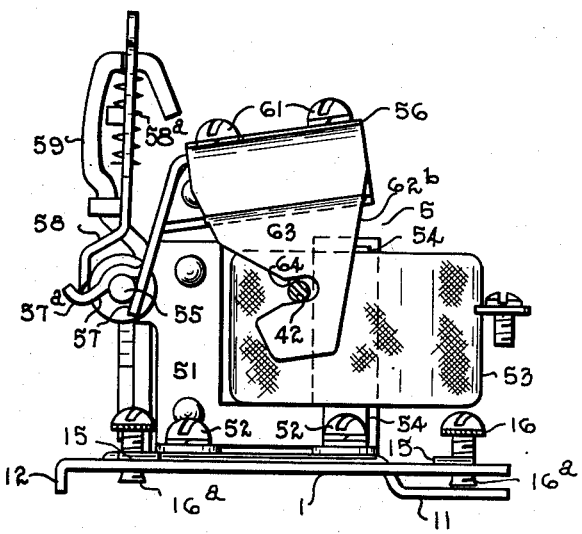
Fig. 7 is a side elevational view of the electromagnetic operating mechanism and the mounting plate shown in Figs. 1 and 2.

As best shown in Figs. 2 and 7, the mounting plate 1, which is preferably punched and stamped from sheet metal, is provided with a plurality of openings, tapped holes, projections and screws. At the upper end of the mounting plate is an offset portion 11 which, together with the bent over flange 12 at the bottom of the plate, serves to space the major portion of the plate away from the panel on which it may be mounted. Opening 13a and 13b are mounting holes which are used in securing the plate to a panel or other support, while tapped holes 14a and rectangular opening 14b are used in securing the electromagnetic switch operating mechanism 5 to the mounting plate. At opposite corners of the mounting plate are partially sheared offsets or projections 15, the ends 15a of which mate with corresponding walls in the bases of the switch assemblies for the purpose of accurately positioning the switch assemblies on the mounting plate. Switch mounting screws 16, by which the various unit switch assemblies are attached to the mounting plate, are preferably permanently attached to the plate by upsetting their ends 16a as shown in Fig. 7. Relatively large rectangular openings 17 are provided to permit projection therethrough of the ends of walking beam or other type mechanical interlocks, in a manner well-known to those skilled in the art, when two of the control devices are used in a reversing starter or other similar installation.

Figure 3:
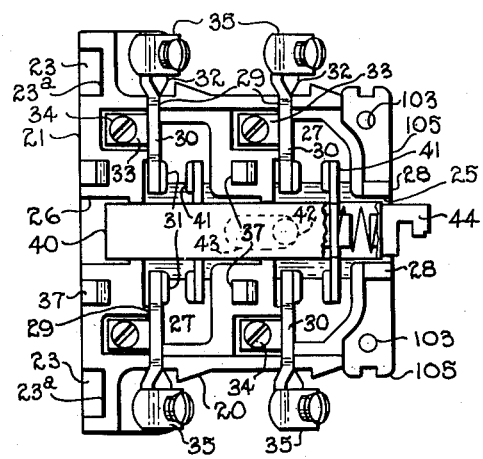
Fig. 3 is a side elevational view of one of the unit switch assemblies shown in Fig. 1, with the cover plate removed to show the internal structure and the arrangement of the contacts.

Unit switch assembly 2, shown in Fig. 1, is typical of the various switches which may be attached to mounting plate 1, and its construction is shown in detail in Figs. 3, 4, 5 and 6, the cover plate 36 being removed in Fig. 3 to show the switch structure. The switch housing 20 is preferably of one-piece molded construction composed of Bakelite or other suitable insulating material. The flat switch base 21 is provided with a flange 22 and a pair of recesses 23. A pair of slots 24 in the flange 22 are provided to receive the mounting screws 16 when the switch unit is attached to the mounting plate, accurate positioning with respect to the center line of the plate being obtained simply by placing the inner walls 23a of recesses 23 in abutting engagement with the ends 15a of projections 15.

Stationary contact brackets 30 each include a contact tip 31, a terminal portion 32, and an apertured mounting flag 33 by which they are attached to the housing 20 by screws 34 and threaded metal inserts (not shown). Accurate positioning of the stationary contacts is obtained by placing them in abutting engagement with the bearing pads 29 molded integrally with the switch housing.

Positioned in a central recesses in switch housing 20 is a reciprocable bridging contactor carrier 40 which is slidingly movable at right angles to the switch base 21. Mounted on the carrier 40 are bridging contactors 41 and an operating pin 42 which projects through an elongated opening (indicated by dotted lines at 43 in Fig. 3) in the inner wall of the switch housing. The contactor carrier is also provided with a hook portion 44 which is adapted to project through an aperture 25 in the switch housing 20 (see Fig. 3). The other end of the carrier fits into another aperture 26, which aperture overlies one of the openings 17 in plate 1 when the switch unit is mounted thereon and thereby provides for use of a mechanical interlock as hereinbefore explained.

Figures 4, 5:
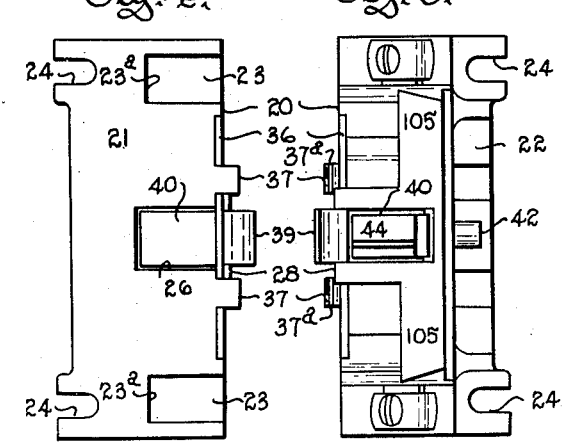
Figs. 4 and 5 are respectively rear and front elevational views of the switch assembly shown in Fig. 3.
Figure 6:
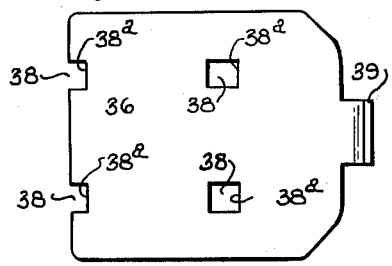
Fig. 6 is a view in front elevation of the switch assembly cover plate which is shown in Figs. 1, 4 and 5.

A one-piece switch cover 36 formed of impregnated fiber board or other similar resilient insulating material is used to hold the carrier 40 in place and also to complete the closing of the individual contact receiving cavities 27. For holding the cover 36 in position, upstanding projections 37 on the housing 20 are provided with transverse slots 37a into which fit the edges 38a of cutouts 38 made in said cover. Lateral displacement of the cover 36 is prevented by bosses 28 formed integrally in the housing 20, and removal of the cover may be effected simply by grasping the outwardly bent lip portion 39 and pulling the one end of the cover outwardly out of engagement with the bosses 28 and projections 37 (Figs. 1, 4 and 18). Thus it will be seen that the unit switch assembly may be quickly and easily opened for inspection of the contacts and possible removal of the contactor carrier without requiring the use of tools or the removal of any additional parts other than the cover plate. For a more detailed description of the movable contactor carrier 40 and the manner in which the bridging contactors are mounted thereon, reference may be had to the United States Patent No. 2,532,305, dated December 5, 1950, for Electric Switch, and assigned to the same assignee as the present case.

Fig. 7 illustrates the mounting plate 1 and the switch operating mechanism 5 as they appear prior to the addition of the unit switch assemblies. The U-shaped stationary magnet 51 is attached to the mounting plate 1 by means of screws 52. The upper leg of the magnet 51 is surrounded by coil winding 53 which is held in place by the bent over ends of metal straps 54 which also are secured by the screws 52. The lower leg of the magnet 51 supports a hinge pin 55 for movement of the magnet armature 56 thereon. Support for the armature 56 is provided by two pairs of bifurcated prongs 57 which are held in engagement with hinge pin 55 by means of a spring-loaded pivot yoke 58 which engages the out-turned lower arms 57a of each of the bifurcated members. Thus, as best shown in Fig. 7, by proper proportioning of the tail spring 53a, which is held in compression between pivot yoke 58 and support bracket 59, the armature 56 may be normally biased away from the stationary magnet 51 to insure a high pickup voltage.

Attached to the movable armature 56 as by screws 61 are left and right hand switch drive brackets 62a—62b. The drive brackets, which turn inwardly to present a flat portion 63 for movement in a plane perpendicular to the plane of the mounting plate, each contain an open-ended pin receiving slot 64. These slots are each adapted to engage a switch operating pin 42 (shown in cross-section) for movement thereof in a plane perpendicular to the mounting plate 1 to effect actuation of the switch or switches associated with each pin (see Figs. 1, 17 and 18).

The ease with which our control device may be assembled and disassembled and the simple manner in which one member may be removed for inspection or replacement now readily becomes apparent. Should it become necessary to replace one switch unit with another, it is only necessary to loosen the mounting screws 16 and slide the unit laterally to the right or left, as the case may be. There is no interference occasioned by the operating connection between the armature assembly and the switch unit because the pin 42 will simply slip out of the slot 64. Likewise, no difficulty is experienced and none of the switch units are disturbed when the armature assembly 56 is removed. To remove the armature it is only necessary to pull the pivot yoke 58 outwardly and lift the armature assembly upwardly and outwardly. An 8-pole contactor switch in which the armature assembly has been removed as above described is shown in Fig. 14.

Figure 9:
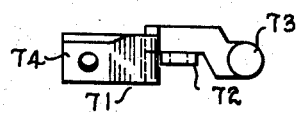
Fig. 9 is a plan view of one of the stationary contact brackets shown in Fig. 8.
Figure 8:
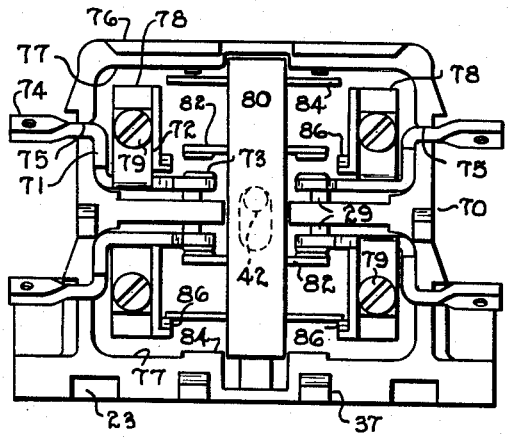
Fig. 8 is a side elevational view of a unit switch assembly by which the electric control device may be made particularly suitable for use as a relay, the cover plate for the assembly being removed.

To render one of our electric control devices particularly adapted for use as a relay, switch units of the type shown in Fig. 8 are provided. Unit switch assembly 70 differs from the previously described switch assembly 2 in that its poles are adapted for either normally-open or normally-closed operation, as indicated by the upper and lower poles, respectively. To permit reverse positioning of the stationary contacts, brackets 71 are provided with mounting flags 72 which extend upwardly from the center line of the contact portion 73 as best shown in Fig. 9. This centrally positioned flag assures that for both positions the contact tips 73 will continue to lie in the same axial plane with respect to the movable contacts. Also, the bracket terminal portion 74 is offset from the contact portion 73 to permit the use of a single external opening 75 in the switch base 76, and channels 77 are provided on both sides of integral bracket mounting posts 78. Screws 79 and threaded metal inserts (not shown) are used to retain the brackets 71 on the mounting posts 78.

Figure 10:
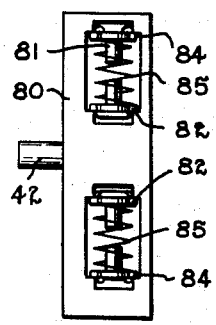
Fig. 10 is a view in side elevation of the movable contactor slide bar shown in Fig. 8.

The contactor carrier 80, in addition to being provided with an operating pin 42, contactor centering projections 81, movable contactors 82 and biasing springs 83, is also provided with spring plates 84 which serve to maintain a substantially constant armature load whether the contacts are positioned for normally-open or normally-closed operation and which also insure good contact pressure for the contacts which are normally closed. The plates 84 are centrally apertured in the same manner as the bridging contactors 82. When mounted for normally-closed operation on the carrier 80 opposite their respective bridging contactors 82 (see Fig. 10), the opposite ends of the plates 84 are resiliently urged by springs 85 against bearing shoulders 86 formed integrally with the stationary contact bracket mounting posts 78. Thus, by proper proportioning of the distance between the stationary contacts and their respective bearing shoulders 86, the spring plates 84 and bearing shoulders 86 provide the reaction force necessary for holding the contacts normally closed independently of the armature and movable contactor carrier assembly. Accordingly, the spring plates 84 and the corresponding bearing shoulders 86 provide the additional advantage of maintaining a high pick-up voltage in a normally-open normally-closed relay because the force of the tail spring 58a is not needed to hold the normally-closed contacts closed. In fact, we have found that when the contacts of one or more poles of a relay made in accordance with our invention are positioned for normally-closed operation, the force of the tail spring 58a need be only strong enough to hold the armature assembly 56 on the hinge pin 55.

When the contacts in a pole of a relay switch 70 are not arranged for normally-closed operation, the spring plate 54 is carried by the carrier 80 in the manner shown in the upper or outer pole in Fig. 8. In such position, the spring plate is free of interference from any portion of the switch structure and also avoids altering the weight of the moving parts, as would be the case if the spring plate were completely removed. A resilient cover plate 87 is used to enclose the contacts and hold the contactor carrier in position.

Relay switch assemblies of the type shown in Fig. 8 may be made with one, two, three or more poles. Accordingly, they may be used to provide electromagnetically actuated relay switches having from one to six or more reversible poles. Figs. 17 and 18 illustrate a four-pole relay switch comprising a pair of the two-pole assemblies illustrated in Fig. 8. The advantages of these improved relay switch are immediately apparent. Not only may any number of relay poles be provided without increasing the area of the panel space required, but also the combinations of normally-open and normally-closed poles are limited only by the number of poles in the device.

In Fig. 11 there is shown with its cover plate 91 removed a unit switch assembly 9 which is particularly useful for adding electrical interlock poles to contactors made in accordance with our invention. Similar to the aforedescribed switch assemblies, the so-called interlock switch 9 comprises a one-piece molded insulating housing 90, an insulating cover plate 91, reversible stationary contact brackets 92 which are secured to integrally molded mounting posts 93, and a sliding contactor carrier 94 which is movable between guides 95. The bridging contactor 96 is preferably mounted in the same manner as the previously described contactors. The contactor carrier 94 also includes a hook portion 97 for interlocking engagement with the corresponding hook portion 44 when the interlock switch assemblies are mounted on contactor switches of the kind shown in Figs. 1 and 14. As best shown in Fig. 12, the contactor carrier 94 in effect becomes an extension of contactor carrier 40 and provides for the addition of switch poles for interlocking or other purposes without the necessity of increasing the panel space required by the control device.

Fig. 12 shows a two-pole normally-open, normally-closed interlock switch and a single pole contactor switch, the cover plates being removed to show the manner in which the switches are connected. To mount an interlock switch on the contactor switch housing a U-shaped mounting strap 101 (see Fig. 13) having tapped openings 102 is slipped over the inside outer end of the molded base or housing so that the openings 102 are placed in alignment with the holes 103 in the contactor housing (see Figs. 2 and 14). The base extensions 104 on the interlock switch housing are then placed in overlapping engagement with the base extensions 105 on the contactor switch housing so that the holes 106 in the interlock base extensions are in alinement with the holes 103. Then after the interlock contactor carrier has been inserted with its hook portion in locking engagement with the hook portion of the other contactor carrier and the interlock switch cover plate has been placed in position, screws 107 are inserted through the cover plate and thence through the base extensions into the mounting straps 101 to hold the units tightly together. To protect against possible interference between the mounting strap 101 and the switch operating pins 42, a semicircular cut out 108 is made in the bracket. Tapping holes 103 would eliminate straps 101.

Fig. 14 illustrates a four-pole electromagnetic contactor having two double-pole interlock switch units mounted thereon for a total of eight poles, the armature assembly being removed as hereinbefore mentioned. It is apparent that a large variety of contactor devices may be provided by replacing one or more of the unit switch assemblies thereon with one or more of the other unit switch assemblies previously described or mentioned, and also that such removal and/or replacement of units does not interfere with the other remaining units.

From the foregoing description it will also be apparent that where the unit contactor switch assemblies are of relatively large capacity and size, two separate interlock switch units may be mounted side by side on the contactor switch housing with both of their contactor carriers connected to the single contactor carrier of the larger switch.

In Fig. 15 there is shown an enlarged sectioned assembly view of the terminal clamps 35 shown in Figs. 3, 17 and 18. These clamps are particularly suitable for clamping two wires of different diameters, indicated by reference numerals 111 and 112. As best shown in Fig. 16, the U-shaped clamping member 113 is cambered so as to provide a convex surface having outer edges 114 for biting into the wires, and also has a central screw receiving aperture 115 surrounded by an outwardly extending flange 115a. The clamping screw 116 is provided with an undercut or reduced neck portion 116a and a beveled head 116b which permits the clamping member 113 to swivel about it. Hence, when the screw 116 is tightened to bring the flat inner side of the screw head into engagement with the flange 115a, the clamping member 113 automatically conforms to the different sized wires to clamp them tightly against the terminal member 32.

Although we have described our novel control device in detail, it is to be understood that our invention lies in the particular arrangement of the parts or units as well as in the specific details of the construction.

We claim:

1. An electric control device comprising, in combination, a unit switch assembly of a selected number of poles having a reciprocating member carrying its movable contacts in spaced relation along the line of reciprocation of said member; an electromagnet having an armature member removably connected to one side of said reciprocating member for effecting operation thereof; and a panel upon which said switch and said electromagnet are individually mounted, movement of said armature causing reciprocation of said contact carrying member perpendicularly of said panel, the number of poles of said switch by virtue of the aforesaid combination being variable without variation of the panel area required by said device.

2. An electric control device comprising, in combination, a first and a second unit switch assembly each of a selected number of poles and having a reciprocating member for carrying its movable contacts in spaced relation along the line of reciprocation of said member; an electromagnet having an armature assembly removably connected to one side of each of said reciprocating members; and a mounting plate upon which are individually mounted said unit switch assemblies with said electromagnet therebetween, movement of said armature causing reciprocation of said contact carrying members perpendicularly of said mounting plate, the number of poles of said unit switch assemblies by virtue of the aforesaid combination being variable without variation of the panel area required by said device.

3. An electric control device comprising, in combination, a mounting plate; a first and a second multi-pole switch individually mounted on said plate, said switches each having a movable contact carrying member with an operating pin extending laterally therefrom; and an electromagnet mounted on said plate between said switches and having a movable armature assembly with a driving connection to said operating pins for movement of said contact carrying members by said electromagnet, said connection leaving said switches removable from said plate without disturbing said armature assembly.

4. An electric control device comprising, in combination, a switch unit, an electromagnet, and a panel supporting said switch unit and electromagnet separately in a side by side relation, said switch unit including a contact carrying member reciprocable perpendicularly of said panel and carrying a pin projecting toward said electromagnet, and said electromagnet having a pivoted armature assembly with a plane of movement perpendicular to said panel and an open slot portion receiving said pin for operative connection of said armature to said reciprocable contact carrying member, said armature assembly being removable from said device without disturbing said switch unit.

5. A multi-pole electric control device comprising, in combination, a pair of enclosed switches, each including a molded housing having an inner wall, an outer removable wall, and positioned between said walls a movable contact carrier having a laterally extending operating pin projecting through an opening in said inner wall; an electromagnet having a removable armature assembly including means for effecting an operative connection between said operating pins and said armature; and a mounting plate upon which are mounted said electromagnet and said switches with the inner wall of said switches adjacent opposite sides of said armature assembly, whereby said armature is readily engageable with said operating pins and disengageable without disturbing said switches and upon removal of said outer walls said movable contact carriers may by lateral movement be removed from said housing.

6. An electric control device comprising, in combination, an electromagnet, at least one enclosed switch unit, and a mounting plate separately supporting said electromagnet and said switch unit in a side by side relation, said electromagnet and said switch unit respectively being provided with an electromagnetically movable element and a reciprocable contact carrying element, one of which elements carries a pin projecting into the other to provide an operating connection therebetween, and said switch unit having a removable side cover upon removal of which said reciprocable element may by lateral movement be disengaged from said movable element of said electromagnet and also removed from the enclosure of said switch unit.

7. An electric control device comprising, in combination, an electromagnet, an enclosed switch unit, and a mounting plate separately supporting said electromagnet and said switch unit in a side by side relation, said electromagnet and said switch unit respectively being provided with an electromagnetically movable element and a reciprocable contact carrying element, the former element having an open slot and the latter element having a pin projecting into said slot to provide an operating connection between said elements, which connection is non-interfering with detachment of said element of said electromagnet without dislocating any part of said switch unit, and said switch unit having a removable side cover upon removal of which said reciprocable contact carrying element may by lateral movement and without disengaging any part of said electromagnet be disengaged from said element of said electromagnet and also removed from the enclosure of said switch unit.

8. An electric control device comprising, in combination, an electromagnet having an armature, an enclosed switch unit comprising a molded housing having a side opening for lateral insertion therethrough of a reciprocal contact carrying member having a removable operating side connection with said armature, and a panel upon which said electromagnet and switch unit are mounted in side by side relation, said switch housing including for holding said reciprocal element in place and for closure of said opening a flat resilient cover plate having a snap engagement with said housing, whereby without the use of tools and without disturbing said armature said cover plate may be removed to permit inspection of said switch and removal of said reciprocable element.

9. In combination, a panel, a pair of enclosed switch units mounted on said panel in a parallel relation and each having a movable contact carrying element reciprocable perpendicularly of said panel, and an electromagnet separately mounted on said panel between said switch units, said electromagnet having electromagnetically operated parts with which said contact carrying elements have side operating connections that may be made and interrupted by mere relative movements of engaging parts thus to be non-interfering with detachment individually of said parts of said electromagnet and said contact carrying elements, said electromagnet having its said parts readily detachable therefrom and readily replaceable thereon and said switch units having on their outer sides removable covers which upon removal permit their respective reciprocable contact carrying elements to be withdrawn therefrom and reinserted by lateral movements.

10. A multi-pole enclosed switch unit comprising a reciprocable element, a plurality of sets of contacts constituting the several poles of said switch, the stationary contacts of each pole being mounted on the enclosure of said switch unit and the movable contacts of each pole being mounted on said reciprocable element in spaced relation along the line of reciprocation of said element, and an operating pin extending laterally from said reciprocable element and exteriorly of the enclosure for said switch, said enclosure having means through the medium of which it is attachable to a panel with said reciprocable element in a relation to the panel to reciprocate perpendicularly of the panel.

11. A switch unit comprising, in combination, a switch housing, a movable contact carrier positioned for reciprocating movement within said housing, said housing having at one end mounting means through the medium of which it is attachable to a panel with said movable contact carrier in a relation to the panel to reciprocate perpendicularly of the panel and having at its opposite end another mounting means by which it is made adaptable for attachment thereto of a second switch unit, and connecting means on said first-mentioned contact carrier for effecting a driving connection with a second movable contact carrier positioned in said second-mentioned switch unit for reciprocal movement along a longitudinal axis substantially coincident with that of said first-mentioned movable contact carrier, whereby the number of electrical poles controlled by said first-mentioned movable contact carrier may be varied without variation of the panel area required by, or disturbing or modifying the parts of, said first-mentioned switch unit.

12. An electric control device comprising, in combination, a mounting plate, a pair of unit switch assemblies attached in parallel relationship to said mounting plate, said switch assemblies each including a movable contact carrier positioned for reciprocal movement perpendicularly of said plate, an electromagnet including an armature having an operating connection with said contact carriers at a point intermediate the ends thereof, and connecting means on the outer ends of said movable contact carriers for effecting a driving connection with other reciprocally movable contact carriers whereby additional unit switch assemblies may be attached to said first unit switch assemblies for actuation by said electromagnet without increasing the panel space required by said device.

13. An electromagnetically operable contactor comprising, in combination, a mounting plate, a pair of main enclosed unit switch assemblies mounted in parallel relationship on said plate and each including a movable contact carrier positioned for reciprocal movement perpendicularly of said plate to open and close the main contacts of said contactor, an electromagnet positioned between said unit switch assemblies and including a movable armature having an operating side connection to each of said movable contact carriers, mounting means on the enclosures for said switch assemblies by means of which interlock unit switch assemblies may be mounted on said main switch assemblies, and connecting means on the outer ends of said movable contact carriers for effecting a driving connection with a reciprocally movable contact carrier in said interlock unit switch assemblies whereby electric interlock switches may readily be added to and removed from said contactor without disturbing the main contacts of said contactor or varying the area of the panel space required by said contactor.

14. A control device comprising, in combination, a mounting plate, an electromagnet attached to said mounting plate and including a movable armature, a pair of drive brackets mounted for movement on said armature and extending in parallel relation toward said mounting plate for movement perpendicularly thereof, said drive brackets each including a slot portion, and unit switch assemblies removably attached to said mounting plate, said switches each having a laterally extending operating pin positioned for driving engagement by the slot portion of its associated drive bracket whereby the circuit controlling characteristics of said device can be varied by substituting for said unit switch assemblies other unit switch assemblies having different circuit controlling characteristics and a similarly positioned operating pin.

15. An electric control device comprising, in combination, a first and a second enclosed switch assembly each having a housing with a reciprocally movable operating pin projecting through a substantially flat side thereof; a mounting plate on which said switch assemblies are mounted in opposed parallel relationship for movement of said operating pins perpendicularly to said plate; and an electromagnet mounted on said plate between said switch assemblies for activation thereof without limiting the length of said assemblies in a direction normal to said plate, said electromagnet including a movable armature member positioned for movement between said switch assemblies and having a side connection with each of said operating pins, whereby either of said switch assemblies or said armature may be replaced without disturbing the other.

16. An electric control device comprising, in combination, a first and a second enclosed switch assembly each having a reciprocally movable contact carrier with an exteriorly projecting operating pin connected to one side thereof; a mounting member on which said switch assemblies are positioned for movement of said contact carriers perpendicularly thereto and with said operating pins facing each other; and an electromagnet positioned between said switch assemblies and having an armature member for activation thereof, said armature member including a pair of oppositely disposed rearwardly extending drive brackets each having a downwardly opening slot portion for driving engagement with the corresponding one of said operating pins.

THEODORE F. ROSING.
EDWIN W. SEEGER.

References Cited in the file of this patent

UNITED STATES PATENTS

| Number | Name | Date |
|---|---|---|
| 1,947,641 | Broekhuysen | Feb. 20, 1934 |
| 2,228,069 | Baum | Jan. 7, 1941 |
| 2,266,536 | Cooper | Dec. 16, 1941 |
| 2,276,698 | Pierce | Mar. 17, 1942 |
| 2,421,641 | Obszarny | June 3, 1947 |
| 2,433,710 | Schleicher | Dec. 30, 1947 |
| 2,449,221 | Hammerly | Sept. 14, 1948 |
| 2,463,333 | Van Valkenburg | Mar. 1, 1949 |
| 2,514,913 | Tyrner | July 11, 1950 |
| 2,532,305 | Heller | Dec. 5, 1950 |
| 2,561,450 | Russell | July 24, 1951 |
| 2,582,131 | Jorgensen et al. | Jan. 8, 1952 |

FOREIGN PATENTS

| Number | Country | Date |
|---|---|---|
| 234,220 | Switzerland | Jan. 3, 1945 |
| 250,187 | Switzerland | May 18, 1948 |
| 591,384 | Great Britain | Aug. 15, 1947 |